United States Patent [19]
Chirico

[11] Patent Number: 5,355,444
[45] Date of Patent: Oct. 11, 1994

[54] EXPERT SYSTEM WTIH A PLURALITY OF INDEPENDENT KNOWLEDGE BASES

[75] Inventor: Neil F. Chirico, Charlotte, N.C.

[73] Assignee: International Business Machines Corporation, Armonk, N.Y.

[21] Appl. No.: 142,888

[22] Filed: Oct. 25, 1993

Related U.S. Application Data

[63] Continuation of Ser. No. 826,200, Jan. 24, 1992, abandoned, which is a continuation of Ser. No. 468,538, Jan. 23, 1990, abandoned.

[51] Int. Cl.$^5$ ............................................. G06F 15/18
[52] U.S. Cl. ........................................ 395/51; 395/50; 395/912
[58] Field of Search ................... 395/911, 912, 51, 11, 395/54

[56] References Cited

U.S. PATENT DOCUMENTS

| | | | |
|---|---|---|---|
| 4,648,044 | 3/1987 | Hardy et al. | 364/513 |
| 4,649,515 | 3/1987 | Thompson et al. | 364/900 |
| 4,839,823 | 6/1989 | Matsumoto | 364/513 |
| 4,910,691 | 3/1990 | Skeirik | 364/513 |
| 4,939,648 | 7/1990 | O'Neill et al. | 364/422 |
| 4,949,278 | 8/1990 | Davies et al. | 364/513 |
| 4,953,147 | 8/1990 | Cobb | 367/35 |
| 4,959,799 | 9/1990 | Yoshiura et al. | 364/513 |
| 4,970,657 | 11/1990 | Wolf | 364/513 |
| 4,985,857 | 1/1991 | Bajpai et al. | 364/551.01 |
| 5,027,305 | 6/1991 | Tanaka et al. | 364/513 |
| 5,043,862 | 8/1991 | Takahashi et al. | 364/162 |
| 5,165,011 | 11/1992 | Hisano | 395/54 |

OTHER PUBLICATIONS

Nation, E. W., "Managing Large Scale Knowledge Bases," Southeastcon '90, Apr. 1990, 286-288.
Hayes-Roth, F., "Rule-Based Systems", Communications of the ACM, Sep. 1985, 921-932.
Ruth et al., 1st-Class Expert System Instruction Manual, George Mason University, Nov. 1989, pp. 1-4, 74-83.
1st-Class Expert Systems, Inc., Tutorials and Knowledge Engineering Guide, Nov. 1989, pp. 2-21 -2-29.
Rosenberg, J. M., Dictionary of Computers, Information Processing and Telecommunications, 2nd Ed., John Wiley & Sons, 1987, p. 49.
Marcot, B. C., "1st-Class Expert Systems: 1st-Class", AI Expert, May 1988, pp. 77-80.
Barr et al., "The Handbook of Artificial Intelligence," vol. I, 1981, pp. 142-152.
Barr et al., The Handbook of Artificial Intelligence, vol. II, 1982, pp. 45-46.
Barr et al., The Handbook of Artificial Intelligence, vol. IV, 1989, pp. 160-180, 189-192.
EXSYS Professional Brochure, EXSYS, Inc., (1988).
Nii, Penny H., "Blackboard Model of Problem Solving", from The Handbook of Artificial Intelligence, vol.IV, (1989), p. 4-17, 168, 169.
McCabe et al., "The Adaptive Diagnostic System", from Fifth Annual Conf. on AI 8 ADA, (1989), pp. 17-27.

*Primary Examiner*—Robert W. Downs
*Attorney, Agent, or Firm*—K. A. Seaman

[57] ABSTRACT

The present invention is an expert system with a plurality of independent knowledge bases, including a process and apparatus for employing an inference engine to select one of the knowledge bases based on one or more key factors. In particular, an embodiment using a batch mode for input of data to the expert system is disclosed, based on which, one of the stored independent knowledge bases is selected and employed in connection with the inference engine. This expert system has application to maintenance of a document processing system, where one of several types of maintenance is selected, causing a respective knowledge base or set of rules to be selected.

1 Claim, 3 Drawing Sheets

EXPERT SYSTEM WTIH A PLURALITY OF INDEPENDENT KNOWLEDGE BASES

The application is a continuation of application Ser. No. 07/826,200, filed Jan. 24, 1992, now abandoned, which is a continuation of co-pending application Ser. No. 07/468,538 filed on Jan. 23, 1990, now abandoned.

BACKGROUND OF THE INVENTION

1. Field of the Invention

This invention relates generally to knowledge engineering systems, and more particularly to a knowledge engineering tool which receives a batch of information (or data) and processes it to reach a conclusion according to one of a plurality of sets of rules.

2. Prior Art

Knowledge systems or expert systems are data processing systems that imitate human expertise and reasoning by using an inference engine and a plurality of stored rules which have been developed as a result of human experience. As a result of this knowledge system or expert system, the experience that a knowledgeable person has developed over a period of time can be made available to others, without requiring that individual to be personally available. Various types of expert systems have been known and used in the past.

Such expert systems have been described and discussed in various publications previously. One version of such expert system has been detailed in U.S. Pat. No. 4,648,044 to Hardy and Joyce and assigned to Teknowledge. Another expert system has been described in prior art U.S. Pat. No. 4,827,418 to Gerstenfeld and assigned to UFA Incorporated. A further expert system or knowledge based processing application was described in U.S. Pat. No. 4,783,752 to Kaplan et al. and assigned to Teknowledge. As yet another example of prior art, U.S. Pat. No. 4,713,775 to Scott et al. describes a problem solving system using a knowledge data base and an inference engine.

The foregoing patents describe various approaches to storing and using the expertise that individuals have developed over time in a computer environment that is, an inference engine with a plurality of rules to develop a response which simulates that of a human expert in a particular field.

The fields to which expert systems have been applied very significantly. One such field is the selection of maintenance functions, particularly preventive maintenance, on complex equipment. For example, in the field of electromechanical document processors, a significant number of mechanical and electromechanical elements work together to move checks and other documents at high speed along a predetermined path, reading information from the check, and sorting it into a desired bin or pocket. The speeds at which these checks travel, up to twenty miles per hour, and the variations in the check size and condition, require a system which is both flexible and resilient. This machine is made up of thousands of parts which wear at different rates, age in different ways and interact with one another in varying ways to produce complex and changing maintenance situations. Preventive maintenance attempts to predict which parts are likely to fail and allow their replacement before failure disrupts production.

Historically, the maintenance of these machines was somewhat of a "black art". An individual mechanic working on such system would develop various specialized understanding (and almost intuition) about the machinery and its future operation, allowing him to perform effective maintenance, even preventive maintenance, which allowed the system to operate efficiently.

Each installation of equipment provides a unique environment in o which the equipment is operated. Some installations prefer - or even require - that the equipment be removed from service for only a short period of time at any given time. This requirement implies that the maintenance must be planned for relatively short downtime. That is, that preventive maintenance must be done within the time constraints which will most improve the operation of the machinery if the user will not tolerate an extended operational delay or a reduced production level due to ineffective or unproductive maintenance.

Recently issued U.S. Pat. No. 4,884,217 describes an expert system with multiple classes of rules such as retrieval rules, analysis rules and action rules, but these sets of rules appear to be applied sequentially rather than one set selected for a given key factor or set of key factors.

Other users designate a given machine for processing documents of poor quality which are expected to have increased feeding problems or create jams and other problems which require frequent maintenance and impose other constraints on maintenance. Accordingly, the maintenance of complex equipment presents situations which require drawing on backgrounds having a significant expertise. Since this expertise cannot be created instantly, there is a requirement for an apparatus which can simulate the thought process of an expert by using an inference engine and a plurality of sets of stored rules, and a selection process in which one of the sets can be selected.

SUMMARY OF THE INVENTION

The present invention overcomes the limitations and disadvantages of the prior art system by providing an expert system, that is, an inference engine with a plurality of stored rules based on the knowledge of an expert. The expert system of the present invention is variable in that it includes a plurality of rule systems (sometimes each rule system is referred to as a "knowledge base") and the information passed to the expert system includes a key factor (or a set of key factors), on which one of the rule systems (or knowledge base) is selected for use with each particular set of information.

The present system has the advantageous effect that one set of rules could be provided for the best maintenance results, if time is not a factor. A second rule system could be provided if the maintenance must be done in a short period of time. A third set of rules may be provided if maintenance must be performed to accomplish a particular objective, for example, the processing of poor quality input documents. Alternatively, a first rule system might be employed to keep costs to a given magnitude, a second rule system for a greater magnitude, etc.

The foregoing and other objects and advantages of the present invention will be apparent to those skilled in the art given the description of the best mode of carrying out the invention, the drawings and the appended claims.

BEST MODE FOR CARRYING OUT THE INVENTION

Figure 1:
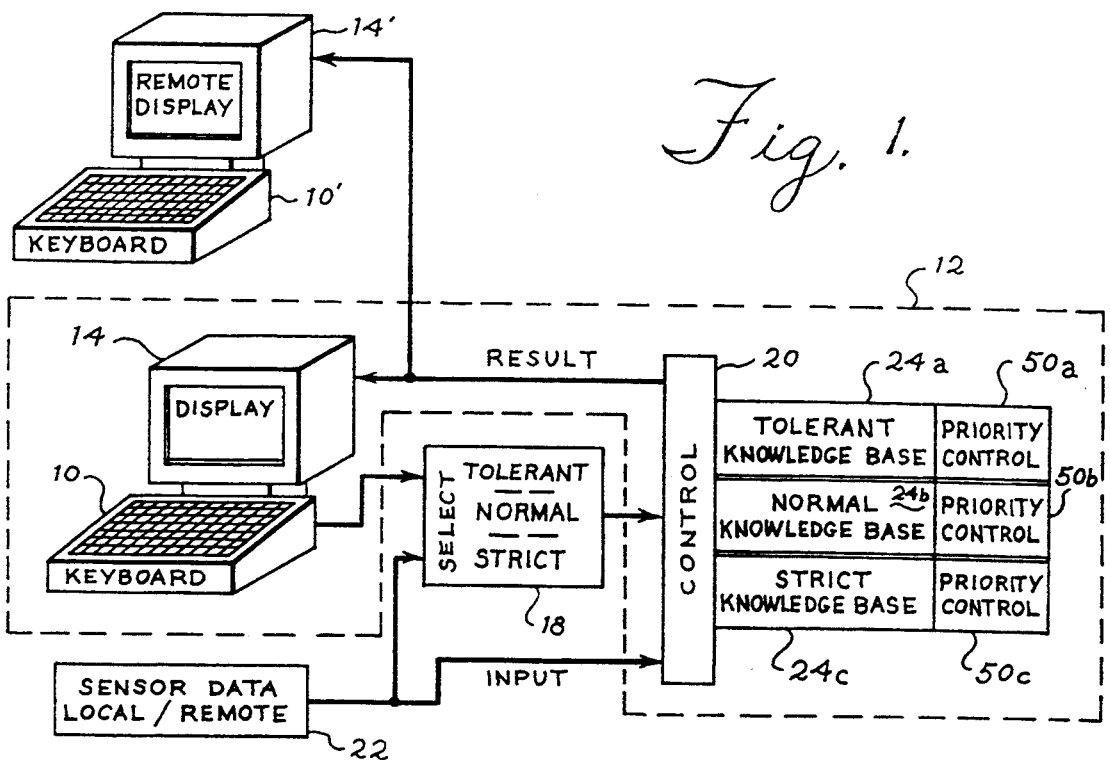
FIG. 1 illustrates the environment of the knowledge based system of the present invention.

With reference to FIG. 1, user provides inputs at a keyboard 10 to a computer system 12 which includes a display 14. This input includes a selection facility 18 which is provided to a control system 20. This control system 20 also receives data from a plurality of input sensors 22. A plurality of knowledge bases 24a, 24b, 24c are each associated with the control system 20. Each of these knowledge bases 24a, 24b, 24c (or rule systems) can be chosen from an initial assumption, (e.g., an environment or other key decision) and the computer 12 includes an inference engine (or software) to process using any one of the stored and selected knowledge bases. This inference engine could, for example, be the inference engine described in U.S. Pat. No. 4,648,044 or, alternatively, a software product IBM sells as its Expert System Environment.

A second or remote keyboard 10' and a remote display 14' also may be optionally coupled to the control system 20 with data received from a plurality of remote input sensors 22. In this way, results can be displayed and the system controlled either locally or remotely.

Selection at the keyboard 10 and/or the sensor data 22 provided to the control system 20 (e.g., 24a) allows the selection of a given knowledge base in the stored program, for example knowledge base 24a. This selected knowledge base 24a then controls the rules that are implemented and ultimately the conclusions which are proposed. Each of these knowledge bases (e.g., knowledge base 24a) operates consistent with the knowledge-based engineering systems previously known, for example, in U.S. Pat. No. 4,648,044 which is specifically incorporated herein by reference.

FIG. 1 illustrates an expert system which may be called a "batch" system, in that a plurality of inputs (sensor data from either local or remote sources) as a single element or batch, rather than an iterative process which seeks only portions of the information in response to queries.

Some of the advantages of batch processing in an expert system are:

1. An improvement in processing time since the Input Data 22 required by the expert system is available at once. There is no delay waiting for a user or system operator to enter Input Data via keyboard.

2. An improvement in accuracy. The Input Data is gathered automatically by the machine or process to be analyzed, and presented to the expert system without manual intervention. There is no opportunity for human error in creating or presenting the Input Data.

3. The ability to transmit the Input Data over telephone or satellite from a remote location, and return the results quickly.

4. An increase in availability of the expert system to a larger number of users.

Figure 2:
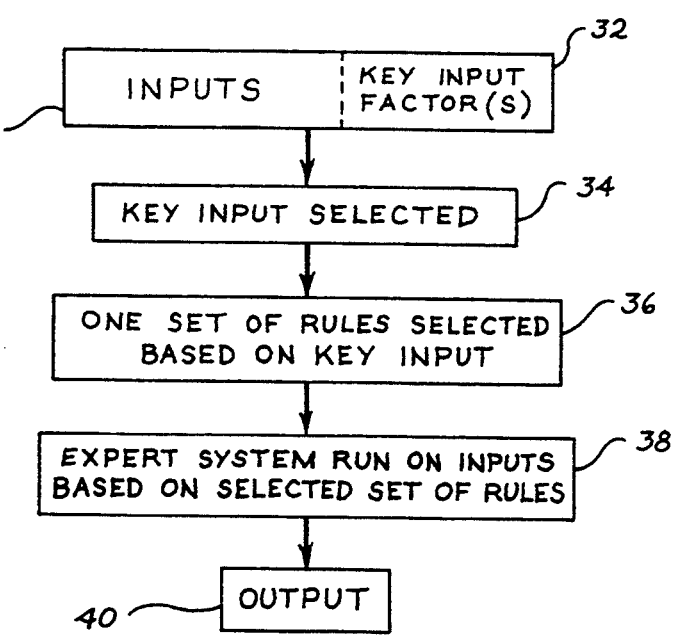
FIG. 2 illustrates a flow chart of the data processing of the present invention.

FIG. 2 illustrates the flow of information of the data processing of the present invention. A set of inputs 30 including a key input factor(s) 32 are generated and provided to the expert system described in FIG. 1.

This is done, in the preferred embodiment, in a batch system or mode, that is, all the information at substantially the same time. However, even if the information is provided serially e.g., from a keyboard before the processing begins, this is an example of a different type of batch processing.

The inputs 30 are analyzed at block 34 to determine the key input factor(s) 32. At block 36 one of the plurality of sets of stored rules is selected. At block 38, the data is then processed using the selected set of rules.

Once a given set of rules is selected, the remainder of the expert system is substantially conventional. That is, the stored rules are used with the various inputs to generate a set of outputs, preferably at the display 14. This step of generating an output from stored rules and a control system which includes an inference engine or a programmed general purpose computer is conventional and may be as described in the incorporated patent.

The key input 32 may be whether maintenance is tolerant, normal or strict or the level to which cost or down time is a factor, as dictated by the needs and desires of the business.

Of course, many modifications and substitutions could be made within the system described without departing from the spirit of the present invention. Also, the system could advantageously use some elements of the present invention without the corresponding use of others. Accordingly, the present description should be considered as merely illustrative of the present invention and not in limitation of it.

Figure 3:
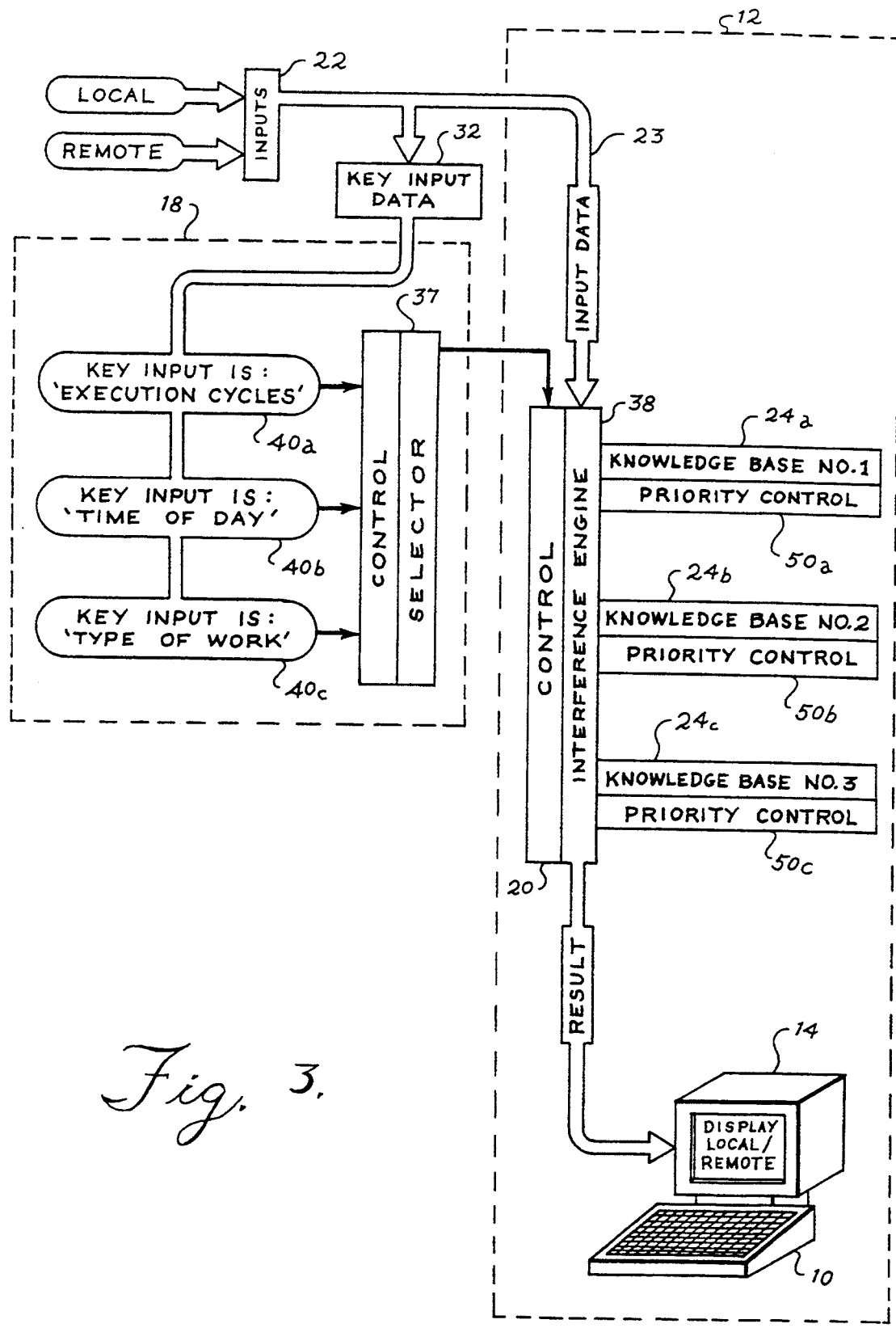
FIG. 3 illustrates in more detail portions of FIG. 1 dealing control and selection of the knowledge base.

FIG. 3 illustrates the knowledge base selection process in detail.

In FIG. 3, Key Inputs 40a, b, and c illustrate modes of operating the Expert System.

The following describes in more detail some types of Key Input modes of operation. This is not the limit to the mode types that can be supported.

| | Key Inputs |
|---|---|
| Execution Cycles: (40a) | This Key Input is the default control and directs Selector 37 to evaluate Key Input Data 32 which deals with the number of Execution Cycles that produced Input Data 23. These Values then become the main factors in determining which KnoWledge Base 24 Selector 37 will request. Selector 37 passes the request to Control 20 which instructs Inference Engine 38 to run with the requested Knowledge Base 24. Execution Cycle scenario: A low number of execution cycles would influence the selection of a Knowledge Base toward one that is more tolerant of input data anomalies with a small sample size. A high number of execution cycles would influence the selection of a Knowledge Base to one that is more strict in its analysis of Input Data 23. Other examples of Key Input Data selection follow, but are not limited to these: |
| Time of Day: (40b) | Use of this Key Input directs Selector 37 to evaluate Key Input Data 32 that defines the Time of Day during which the input data was created. These values then become the main factors in determining which Knowledge Base 24 Selector 37 will request. Selector 37 passes the request to Control 20 which instructs Inference Engine 38 to run with |

| Key Inputs | |
|---|---|
| | the requested Knowledge Base 24.<br>Time of Day scenario:<br>A Time of Day Key Input, for example, would allow the selection of a Knowledge Base that is work shift related. Differences in operators skill, training, or the job mix that spans different shifts may need this special consideration. |
| Type of Work: | Use of this Key Input directs Selector 37 to evaluate Key Input Data 32 that deals with the type of work done by this machine or process.<br>These values then become the main factors in determining which Knowledge Base 24 Selector 37 will request. Selector 37 passes the request to Control 20 which instructs Inference Engine 38 to run with the requested Knowledge Base 24.<br>Type of Work scenario:<br>During the operation of a machine or process there are types of work that create unusual stress on the machine or process. An example of this would be the feeding of damaged paper documents into a document sorter thereby creating unusual jam conditions that otherwise would not occur with normal documents.<br>If run often, this type of work creates a false impression of the condition of the machines or process. The Knowledge Base selection would compensate for this unusual condition by being more fault tolerant in certain areas of analysis. |

Figure 4:
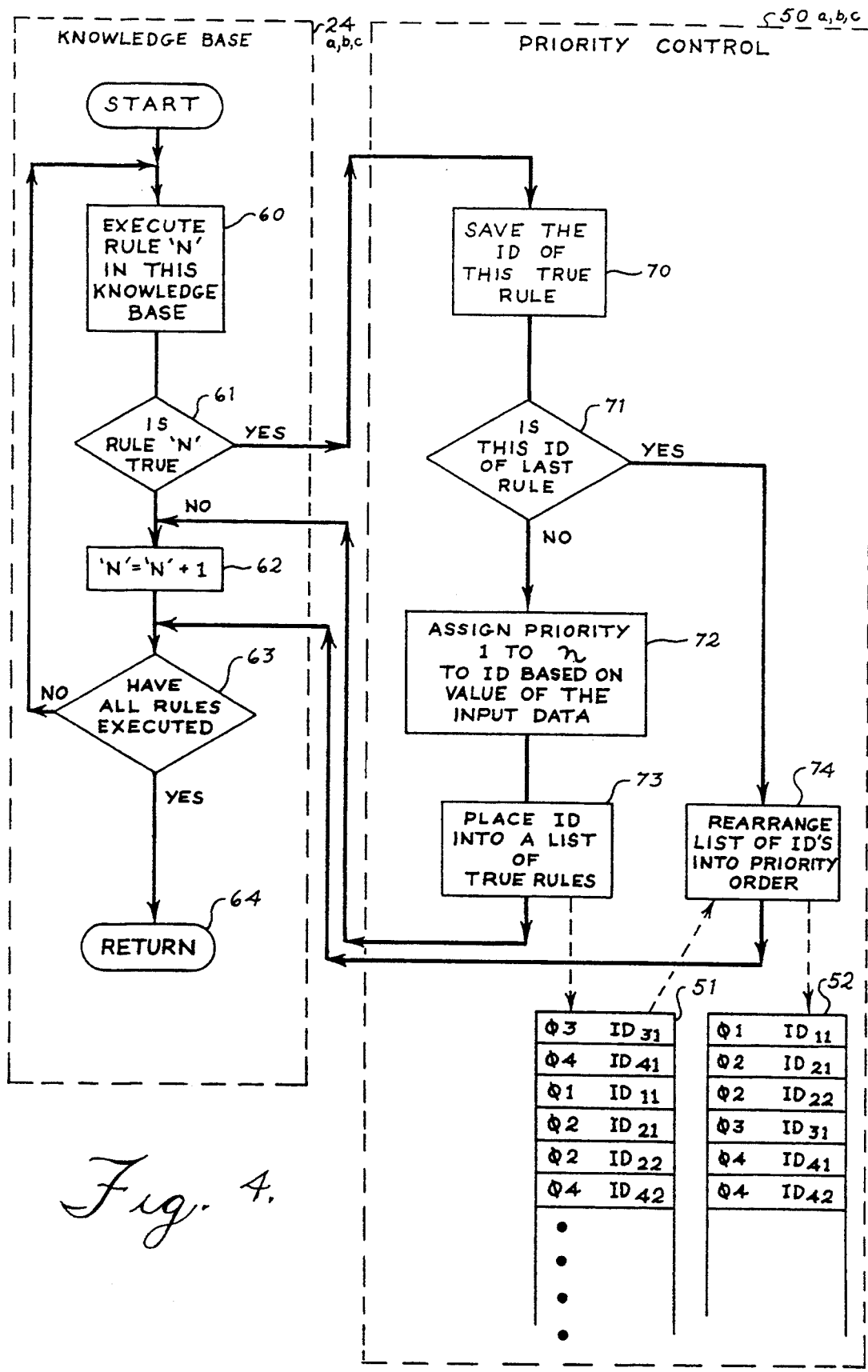
FIG. 4 illustrates logic for presenting a prioritized list of recommendations from the expert system, assuming that prioritized list has been requested in the expert system.

FIG. 4 describes the action of a selected priority control 50 and its interaction with the selected knowledge bases 24.

The inference engine 38 (described previously in connection with FIG. 3) will execute the selected knowledge base 24 by executing each rule within the knowledge base at a block 60. The rule is tested at block 61, and if the rule is NOT true, then the next rule is selected at block 62. If all rules have NOT been executed at block 63, the next rule is executed again at the block 60. This loop continues until all rules have been executed.

If a rule tests "true", block 61, the identity of that rule is saved by priority control box 50 at block 70. If the identity of the rule indicates that this is NOT the last rule at block 71, then a priority is assigned to that identity based upon the value of the input data and the criteria within the "true" rule at block 72. Block 73 places the identity/priority in a sequential list, 51. Control is then returned to the inference engine (described in connection with FIG. 3) running the knowledge base at block 63. This sequential list, 51, continues to grow as each true rule test is determined.

If this is the last rule, block 71, then block 74 rearranges list 51 into priority order, list 52, and control is returned to the inference engine, block 63. The final results are then returned, block 64, to the expert system. Priority order may be with the most critical or important maintenance function, or may relate to other similar functions which may be ordered. In this embodiment the last rule need not be placed into the list of true rules or assigned a priority since the last rule is merely an indication of the end of this set of stored rules.

While the present invention has been described in its preferred embodiment, many modifications will be apparent to those skilled in the art without departing from the principles of this invention. For example, three knowledge bases have been described in the foregoing description, but depending on the types of decisions, input factors and outputs, more or less could be used to advantage. Further, the remote display and keyboard are, of course, optional, and might not be needed in an appropriate situation. The sensor data may not be required in an appropriate situation. Accordingly, the foregoing description should be considered as illustrative of the present invention and not in limitation thereof.

Having thus described the invention, what is claimed is:

1. An expert system for controlling maintenance on a machine requiring periodic maintenance;
   an inference engine for processing an input and generating an output including a prioritized list of maintenance activities based on a set of rules related to the maintenance activities on the machine;
   a plurality of stored sets of rules relating to maintenance of the machine and prioritization of such maintenance;
   an input including a key factor relating to the maintenance of the sorting machine, each value of the key factor having associated with it one set of stored rules, said key factor chosen from tolerant, normal and strict and the set of stored rules includes a tolerant set of maintenance rules, a normal set of maintenance rules and a strict set of rules; and
   means responsive to said key factor for selecting the associated set of stored rules for processing by the inference engine and for generating a prioritized list of maintenance activities based on the key factor, whereby the inference engine uses the selected set of rules to process the input and generate an output indicative of maintenance to be performed on the machine.

* * * * *